US012556563B2

(12) United States Patent
Wang et al.

(10) Patent No.: US 12,556,563 B2
(45) Date of Patent: Feb. 17, 2026

(54) COMPUTER METHOD FOR RANKED ENSEMBLE FILTERING OF COMPUTER NETWORK TRANSMISSIONS

(71) Applicant: Entanglement, Inc., Miami, FL (US)

(72) Inventors: Haibo Wang, Laredo, TX (US); Richard T. Hennig, Westminster, CO (US)

(73) Assignee: Entanglement, Inc., Miami, FL (US)

( * ) Notice: Subject to any disclaimer, the term of this patent is extended or adjusted under 35 U.S.C. 154(b) by 31 days.

(21) Appl. No.: 18/631,736

(22) Filed: Apr. 10, 2024

(65) Prior Publication Data

US 2024/0348632 A1 Oct. 17, 2024

Related U.S. Application Data

(60) Provisional application No. 63/495,478, filed on Apr. 11, 2023.

(51) Int. Cl.
*H04L 9/40* (2022.01)
(52) U.S. Cl.
CPC ................ *H04L 63/1425* (2013.01)
(58) Field of Classification Search
CPC ............. H04L 63/1416; H04L 63/1433; H04L 63/1425; H04L 63/1441
See application file for complete search history.

(56) References Cited

U.S. PATENT DOCUMENTS

| 10,484,429 | B1 | 11/2019 | Fawcett |
| 11,100,373 | B1 | 8/2021 | Crosby |
| 11,417,102 | B1 | 8/2022 | Meingast |
| 11,455,570 | B2 | 9/2022 | Abdulaal |
| 11,457,031 | B1 | 9/2022 | Bisht |
| 11,496,495 | B2 | 11/2022 | Babu |

(Continued)

FOREIGN PATENT DOCUMENTS

KR 102337070 B1 12/2021

OTHER PUBLICATIONS

Yadav et al., "Detection of Anomalies in Traffic Scene Surveillance," 2018 Tenth International Conference on Advanced Computing (ICoAC) Year: 2018 | Conference Paper | Publisher: IEEE.*

(Continued)

*Primary Examiner* — Roderick Tolentino
(74) *Attorney, Agent, or Firm* — Sheppard Mullin Richter & Hampton LLP

(57) ABSTRACT

Systems and methods are described for automated anomaly detection. For example, the system receives various types of unlabeled data and determines, through an unsupervised machine learning model, a label for the data. The labels are provided to a supervised machine learning model during a first training process. The system also performs unsupervised labeling and supervised labeling of network flows to infer anomalous network traffic. When new data is received, the supervised machine learning model is executed during an inference process to cluster the new data in accordance with the labels that were determined by the unsupervised machine learning model. In some examples, the system may combine the unsupervised machine learning model with a supervised machine learning model to perform automated anomaly detection.

20 Claims, 12 Drawing Sheets

(56) References Cited

U.S. PATENT DOCUMENTS

| | | | |
|---|---|---|---|
| 11,641,368 B1* | 5/2023 | Shah | H04L 63/083 |
| | | | 726/6 |
| 11,899,760 B2 | 2/2024 | Groth | |
| 12,375,519 B2* | 7/2025 | Semel | H04L 63/1425 |
| 2011/0154132 A1 | 6/2011 | Aybay | |
| 2014/0325649 A1 | 10/2014 | Zhang | |
| 2016/0219071 A1 | 7/2016 | Vasseur | |
| 2016/0330225 A1 | 11/2016 | Kroyzer | |
| 2018/0004948 A1 | 1/2018 | Martin | |
| 2018/0013776 A1* | 1/2018 | Gay | G06N 20/00 |
| 2019/0102682 A1 | 4/2019 | Jayaraman | |
| 2019/0188212 A1 | 6/2019 | Miller | |
| 2019/0222596 A1 | 7/2019 | Abbaszadeh | |
| 2020/0204575 A1* | 6/2020 | Luan | G06N 20/00 |
| 2020/0226490 A1 | 7/2020 | Abdulaal | |
| 2020/0351283 A1 | 11/2020 | Salunke | |
| 2020/0387797 A1 | 12/2020 | Ryan | |
| 2021/0110197 A1 | 4/2021 | Julio | |
| 2021/0142152 A1 | 5/2021 | Burkhart | |
| 2021/0194891 A1* | 6/2021 | Burke | H04L 63/1416 |
| 2021/0194907 A1* | 6/2021 | Bertiger | H04L 43/0811 |
| 2021/0264300 A1 | 8/2021 | Staudinger | |
| 2021/0279644 A1 | 9/2021 | Givental | |
| 2021/0281592 A1* | 9/2021 | Givental | G06N 20/10 |
| 2021/0288991 A1* | 9/2021 | Shakarian | H04L 41/16 |
| 2021/0374614 A1 | 12/2021 | Sampaio | |
| 2022/0012626 A1 | 1/2022 | Ben-Itzhak | |
| 2022/0107744 A1 | 4/2022 | Capelo | |
| 2022/0188690 A1 | 6/2022 | Rawat | |
| 2022/0222568 A1 | 7/2022 | Mukherjee | |
| 2022/0255897 A1 | 8/2022 | Miele | |
| 2022/0343115 A1 | 10/2022 | Kanta | |
| 2022/0353284 A1* | 11/2022 | Vörös | H04L 63/20 |
| 2022/0391639 A1 | 12/2022 | Gurumurthy | |
| 2023/0269264 A1* | 8/2023 | Yao | H04L 63/1425 |
| | | | 726/23 |
| 2023/0273998 A1* | 8/2023 | Polychronou | G06F 21/566 |
| | | | 726/22 |
| 2023/0275915 A1* | 8/2023 | Kaul | H04L 63/1425 |
| | | | 726/23 |
| 2023/0297716 A1 | 9/2023 | Bella | |
| 2023/0362180 A1 | 11/2023 | Vasic | |
| 2024/0163298 A1 | 5/2024 | Wang | |
| 2024/0184916 A1 | 6/2024 | Bella | |
| 2024/0346136 A1 | 10/2024 | Wang | |

OTHER PUBLICATIONS

Zhang et al., "Unsupervised Deep Subgraph Anomaly Detection," 2022 IEEE International Conference on Data Mining (ICDM) Year: 2022 | Conference Paper | Publisher: IEEE.*

International Search Report and Written Opinion mailed Apr. 4, 2024, in International Application No. PCT/US2023/079914, filed Nov. 15, 2023, 8 pages.

International Search Report and Written Opinion mailed Mar. 8, 2024, in International Application No. PCT/US2023/079917, filed Nov. 15, 2023, 9 pages.

International Search Report and Written Opinion mailed Jul. 31, 2024, in International Application No. PCT/US2024/023888, filed Apr. 10, 2024, 8 pages.

* cited by examiner

Lateral movement
132MB was transfered from 10.1.0.29 to 192.168.1.1 at 9:32 AM

EVENTS (40)

| Source IP | Destination IP | Source Port | Destination Port | Protocol | Bytes | Time |
|---|---|---|---|---|---|---|
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |
| 10.24.1.18 | 192.168.3.8 | 38214 | 22 | SSH | 92 | 10:24 PM |

Showing: All Columns ⌄

INFORMATION

Is this a real threat?

✓ YES   ✕ NO

⇧ SHARE   ⤓ DOWNLOAD

FIG. 10

COMPUTER METHOD FOR RANKED ENSEMBLE FILTERING OF COMPUTER NETWORK TRANSMISSIONS

CROSS-REFERENCE TO RELATED APPLICATION

This application is a non-provisional patent application of U.S. Patent Application Ser. No. 63/495,478, filed Apr. 11, 2023, which is herein incorporated by reference.

This application is also related to U.S. patent application Ser. No. 18/510,477, filed Nov. 15, 2023, entitled "AUTOMATED THREAT DETECTION SYSTEM", International Application No. PCT/US2023/079914, filed Nov. 15, 2023, entitled "AUTOMATED THREAT DETECTION SYSTEM", U.S. patent application Ser. No. 18/510,490, entitled "RETRAINING SUPERVISED LEARNING THROUGH UNSUPERVISED MODELING", and International Application No. PCT/US2023/079917, filed Nov. 15, 2023, entitled "RETRAINING SUPERVISED LEARNING THROUGH UNSUPERVISED MODELING", which are herein incorporated by reference in their entirety.

BACKGROUND

Traditional computer systems have inherent and hard to find vulnerabilities that can allow unpermitted access to these systems. Threat detection is often provided to try to identify when the unpermitted access is initiated. However, by the time that the fraudster has access to the computer system, it may be too late to remediate the unpermitted access and further protect the sensitive data and corresponding systems. Better methods are needed.

BRIEF DESCRIPTION OF DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 10 is an example anomaly detection display, in accordance with some of the embodiments disclosed herein.

Figure 1:
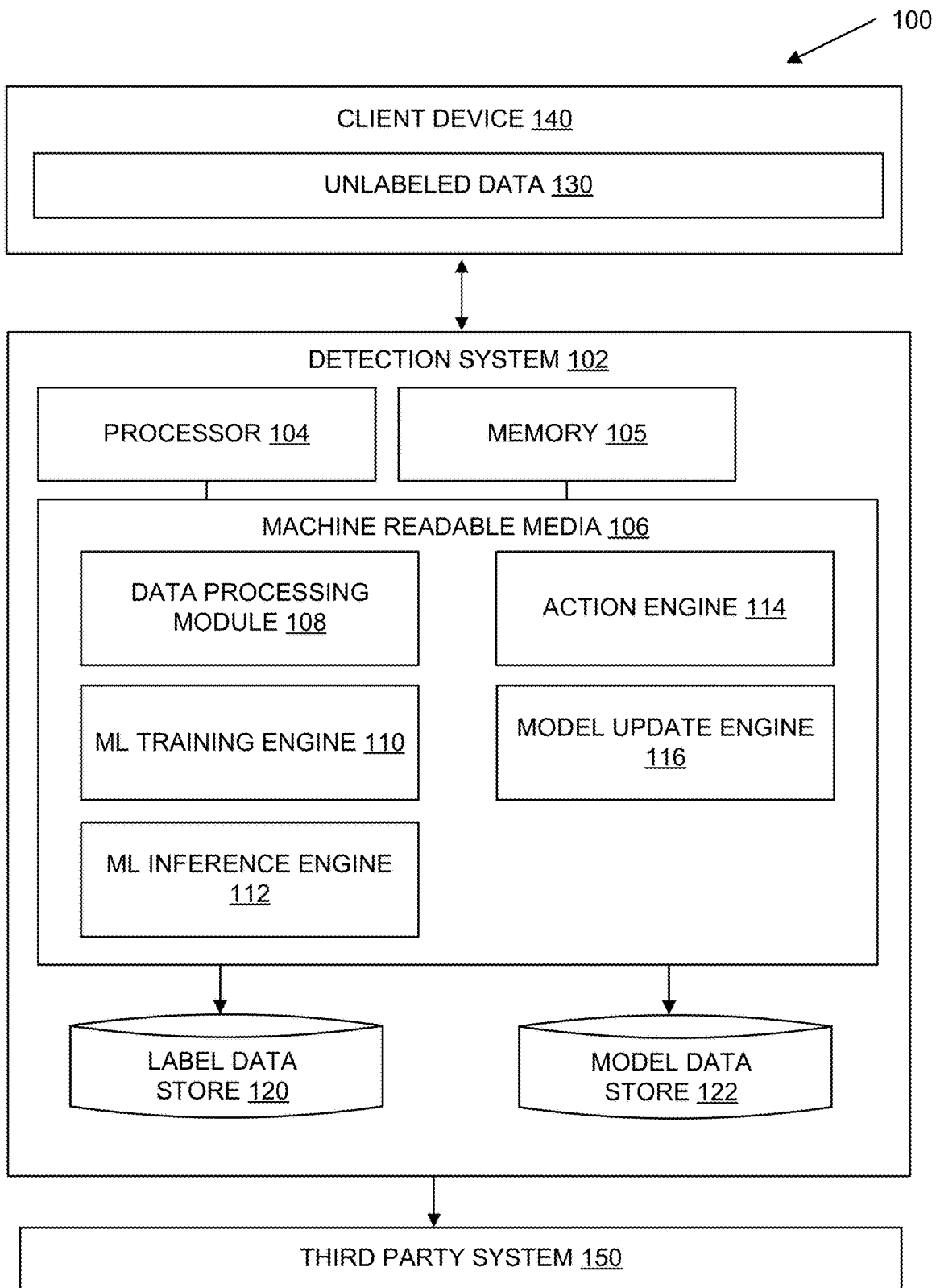
FIG. 1 is a computer system for performing automated anomaly detection, in accordance with some of the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In some examples, a computer method is described for unsupervised labeling of potentially anomalous data (e.g., computer network data communications) for anomaly detection, which includes receiving a number N of computer network data communication flow records. Additionally, a number M of unsupervised learning methods can be applied to each of the N flow records. A score for each of the N network data communication flow records is received from each of the M unsupervised learning models. The scores are assembled into an N by M matrix. The N by M matrix is factored to determine the subsets of unsupervised learning methods as factors. Each selected unsupervised learning method is weighted respectively according to a factor loading value of the unsupervised learning method to derive a respective final score. One unsupervised learning method per subset is selected to produce an aggregation of scores of the selected unsupervised learning methods. In some embodiments, a voting algorithm is applied based on distribution of the loading value from each unsupervised learning method. One or more distribution tests is performed on the final scores to identify anomaly probabilities according to respective distributions. A list of flow records represented by the distribution is output to an output cache.

Many unsupervised learning methods have statistical assumption of Gaussian distribution on datasets and rely on the measure of probability, density, and distance. Thus, the unsupervised learning methods often produce the false positive results on the same pattern when there is high dimensional data, the measure used in the learning methods fails when the dataset contains irrelevant features/attributes because it will produce the similar value (probability, density, and distance). Some refer to such phenomenon as the "curse of dimensionality."

The aggregation of the classification labels from the set of unsupervised learning methods with similar behaviors will not reduce the overall false positive rate, which is a key performance indicator of anomaly detection. This is related to the choice of unsupervised learning, where the unsupervised learning methods are chosen with diversity. This approach will take the decision scores from a set of unsupervised learning methods to construct a N by M matrix, where N is the number of data points, M is the number of unsupervised learning methods, then apply Factor Analysis to determine the subsets of unsupervised learning methods as factors. Each subset of unsupervised learning methods represents a latent dimension of the data. A latent dimension of data can refer to a hidden or unobserved variable that captures the underlying patterns or relationships within the data. One unsupervised learning method per latent dimension is chosen and weighted by its factor loading value to construct final scores for determining the anomalies. A set of distribution tests is performed on the final score and anomalies are identified by the associated distribution.

In some examples, the system receives various types of unlabeled data, including network data. The system determines, through an unsupervised machine learning model, a label for the data (e.g., "1" for outlier data and "0" for normal data). The labels are provided to a supervised machine learning model during a first training process. When new data is received, the supervised machine learning model is executed during an inference process to cluster the new data in accordance with the labels that were determined by the unsupervised machine learning model. In some examples, a label audit process may be implemented to update the cluster/output of the supervised machine learning model. The updated labels from the label audit process may be provided back to the supervised machine learning model during a second training process. In other words, the system may combine the unsupervised machine learning model with a supervised machine learning model to perform automated anomaly detection.

In some examples, the system implements a label audit process using a series of quadratic unconstrained binary optimization (QUBO) problems with a solver program, solving the series of QUBO problems with a quantum or quantum-inspired computer, and converting the QUBO solutions to initiate a threat detection with the solver program.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a computer system for performing automated anomaly detection, in accordance with some of the embodiments disclosed herein. In example 100, detection system 102 comprises processor 104, memory 105, and machine-readable media 106. Detection system 102 may be a server computer that communicates via network communications to other devices accessible on the network, including client device 140 and third party system 150. Detection system 102 may receive unlabeled data 130 (e.g., network traffic, sensor data, firewall data, IoT data, or other telemetry data) from client device 140 and third party system 150 in a distributed communication environment.

Processor 104 may comprise a general-purpose or special-purpose processing engine such as, for example, a microprocessor, controller, or other control logic. Processor 104 may be connected to a bus, although any communication medium can be used to facilitate interaction with other components of detection system 102 or to communicate externally.

Memory 105 may comprise random-access memory (RAM) or other dynamic memory for storing information and instructions to be executed by processor 225. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable media 106 may comprise one or more interfaces, circuits, and modules for implementing the functionality discussed herein. Machine readable media 106 may carrying one or more sequences of one or more instructions processor 104 for execution. Such instructions embodied on machine readable media 106 may enable detection system 102 to perform features or functions of the disclosed technology as discussed herein. For example, the interfaces, circuits, and modules of machine-readable media 106 may comprise, for example, data processing module 108, ML training engine 110, ML inference engine 112, action engine 114, and model update engine 116.

Data processing module 108 is configured to receive data from client device 140, including end user devices, sensors, or software systems. The source of the data may comprise sensors, IoT devices, satellite, third party entities (e.g., Netflow, Zeek, CrowdStrike, vpcFlow, Elk, Splunk, cloud storage sources, Tanium, ICS, SCADA, or Tenable), or other end user devices. The format of the data may comprise a structured format, such as JSON, XML, or binary. In some examples, the data is ingested by collecting, receiving, and storing the data generated by the client device.

In some examples, the data may comprise various telemetry data, including streaming or batched data. The term "telemetry" may correspond with remote measurement and transmission of information about the client device. In some examples, the data may include information about the performance, security, status, and behavior of the client device.

The data may be generated by client device 140 corresponding to a sensor, IoT device, server, network equipment, or application installed at client device 140. In some examples, the source of the data may continuously generate the data, which is transmitted via a network to detection system 102 and processed by data processing module 108. The transmission of the data may be transmitted using different protocols like HTTP, MQTT, or custom protocols specific to the application or industry of the particular embodiment.

In some examples, the data received by client device 140 is unlabeled data. The information received with the data can include a data packet header, payload, or metadata that is added during the transmission of the data. In this sense, the data packet header, payload, or metadata that is added during the transmission of the data may not correspond with the label added by detection system 102 later in the process. Instead, the label added by detection system 102 may correspond with data characteristics of the data that can identify the type of data upon analysis of the data packet, and the label added by detection system 102 may not be provided with the data as it is received by detection system 102.

ML training engine 110 is configured to train both unsupervised machine learning models and supervised machine learning models. Various training methods are described herein and implementation of any of these training methods will not divert from the essence of the disclosure.

In some examples, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with that characteristic. When dimensionality reduction is implemented, the process may reduce the number of input variables or features under consideration to simplify the complexity of the dataset by transforming it into a lower-dimensional space while preserving important information. When association rule learning is implemented, the process aims to discover relationships, patterns, or associations within the unlabeled data, and generate a label for the corresponding data. In any of these instances, the unsupervised machine learning model may generate or assign a label that corresponds with "1" for outlier data and "0" for normal data. In some embodiments, an unsupervised algorithm for labeling is employed in accordance with an architecture (shown in FIG. 2) and method, as disclosed herein.

The unsupervised machine learning models may be trained on unlabeled data to assign or generate a label for the unlabeled data. The unlabeled data may be received without labeled outputs or target variables. In an illustrative example, the data may comprise security logs from client device 140 and the unsupervised machine learning model may be trained to label the data. The labels may correspond with "1" (yes, a security log) or "0" (not a security log) and may be assigned by the unsupervised machine learning model. In another example, the label may correspond with "1" (e.g., normal data) or "0" (e.g., outlier data) based on the characteristics of the data. In another example, the label may correspond with multiple values, including a value associated with one or more data characteristics (e.g., non-binary label). The label determined during the training process may be stored in label data store 120.

In some examples, the unsupervised machine learning model may identify new data types that are included with the unlabeled data from client device 140. When new data is identified (e.g., when the characteristics of the data do not match pre-existing data characteristics that are previously assigned to labels), a new or second label may be generated and assigned to the unlabeled data. The label that is generated during the training process may be stored in label data store 120.

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

ML training engine 110 is also configured to train a supervised machine learning model. The supervised machine learning model may be trained using the label that was determined from the unsupervised machine learning model and stored in label data store 120.

In some examples, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model (e.g., by accessing label data store 120), the process iteratively adjusts parameters of the model to minimize the difference between its predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process to adjust the parameters is gradient descent, although various optimization functions may be implemented. In some examples, the gradient of the loss function may be calculated with respect to the model parameters. The parameters may be updated in the opposite direction of the gradient to minimize the loss.

The trained supervised machine learning model may be stored in a model data store 122 as a trained machine learning model. The trained machine learning model may be used during an inference process when new unlabeled data is received by detection system 102.

ML inference engine 112 is configured to initiate an inference process using the trained models stored in model data store 122. The trained machine learning model may make predictions or generate outputs for new unlabeled data. For example, once the supervised machine learning model is trained on a labeled dataset (e.g., that has been labeled using the unsupervised machine learning model), the machine learning models stored in model data store 122 can be deployed for inference of the new data. In some embodiments, a supervised or semi-supervised algorithm for labeling is employed in accordance with an architecture (shown in FIG. 3) and method, as disclosed herein.

The inference process may comprise, for example, providing the unlabeled data to the trained model as input. The processing of the data may vary based on the type of model to be associated with the unlabeled data. For example, in a neural network, the model may receive the unlabeled data as input and process it through the layers of the neural network to generate output. The output of the neural network may provide determined similarities between previously received data and new data (e.g., whether the new data is similar or not similar to the previously received data with respect to a similarity threshold). In decision trees, the model may receive the unlabeled data as input and process it through its decision boundaries. In either of these implementations, the model may generate a prediction as output of the unlabeled data.

ML inference engine 112 is also configured to generate a set of clusters of labeled data as the prediction/output of the model. In creating the set of clusters, the model may apply the learned patterns and relationships determined during training to the new data. In some examples, the model may generate clustered data with the highest probability of corresponding with the unlabeled data, and group each set of similar data (within a similarity threshold) in the common cluster. In some examples, the output may comprise a confidence score that the data corresponds with the particular cluster (e.g., normal data) or does not correspond with any cluster (e.g., outlier data).

ML inference engine 112 is also configured to generate a confidence score associated with the inference process for the likelihood that the unlabeled data is to be grouped in the clustered data. The confidence score may identify the probability that the supervised machine learning model assigns to the prediction or classification.

Various confidence scores may be implemented. For example, a confidence score may be determined for each cluster and the greatest confidence score associated with the particular cluster may determine which cluster the data are assigned. In other examples, confidence score for a positive cluster may exceed a predetermined threshold (e.g., 0.5), the supervised machine learning model might predict it as the positive cluster/group. Otherwise, the supervised machine learning model may predict the opposite or a negative cluster/group. In this sense, the confidence score may be used as a thresholding for classification.

In some examples, the confidence score may correspond with the determination that the unlabeled data is outlier data.

In other words, the unlabeled data corresponds with data that is previously unlabeled and not similar to other previously labeled data in the system. A correlation may exist between the confidence score and the determination of outlier data, including an instance when the data is not similar to existing data. In some examples, an action may be recommended or initiated (e.g., to remedy a potential threat).

Action engine 114 is configured to initiate an action in association with the data received from the client device. For example, in response to detecting a threat or unpermitted access to the client device in the data, or in response to identifying outlier data, the action may be initiated. In some examples, the action may be to add the data to an outlier queue for further review.

In some examples, the action corresponds with remediating the detected anomaly or threat. In some examples, the action may refer to the steps taken to mitigate or eliminate a network threat once it has been identified, which can provide a technical improvement for the system overall. The system may respond quickly to a network anomaly or threat to improve cybersecurity, minimize potential damage, and potentially prevent further compromise.

The action may comprise initiating an isolation of the affected systems to prevent the anomaly or threat from spreading further. This might involve disconnecting or transmitting an alert to recommend disconnecting the compromised client device from the network. In other examples, the action may implement network segmentation to separate or contain the impact of the detected anomaly.

The action may comprise a recommendation to initiate an investigation to understand the nature and scope of the anomaly or threat. The action may involve analyzing data/security logs, network traffic, or other sources. The investigation may help identify the source, methods, and potential impact of the anomaly. In other examples, the investigation may help determine the vulnerabilities that allowed the anomaly or threat to access the client device. For example, the action can identify outdated software, misconfigurations, or other weaknesses in the network infrastructure, suggest updating patches or security tools, changing access credentials, or other actions in response to the detected anomaly.

In some examples, the action may include updating an application programming interface (API), dashboard, or other display. Various examples of the API, dashboard, or display are provided with FIGS. 7-10.

Model update engine 116 is configured to review output from the supervised machine learning model and, in some examples, validate or update the results from the model. In some examples, the model update engine 116 may initiate a label auditing process. During the label auditing process, model update engine 116 may revise labels associated with particular data or data characteristics. For example, the data associated with the label may be measured for similarity. The data value that is greater than a predetermined threshold value may be provided for further review. In some examples, additional labels may be added by a human user to output from the supervised machine learning model.

In some examples, the labels that are determined during the label auditing process may be provided back to the supervised machine learning model to retrain the model during a second training process. The retrained supervised machine learning model may be stored in model data store 122 and/or provided for future inference processes on new data that is received from client device 140.

Unlabeled data 130 may comprise any data that is received at detection system 102 via network communications from client device 140. In some examples, client device 140 may generate unlabeled data, including network traffic, sensor data, firewall data, IoT data, or other telemetry data. The labeling aspect of the unlabeled data may correspond with a machine learning model that has associated a particular label to the unlabeled data from client device 140, including an unsupervised machine learning model. The data generated by client device 140 may correspond with metadata or other characteristics of the data, without also corresponding with a label. In some examples, unlabeled data 130 may be aggregated and characterized by detection system 102 using data processing module 108 as described herein. In some examples, unlabeled data 130 is processed or filtered according to methods and systems described herein.

Client device 140 is configured to generate, transmit, and receive data from detection system 102. Client device 140 may be any end user devices, sensors, or software systems. The source of the data may comprise sensors, IoT devices, satellite, third party entities (e.g., Netflow, Zeek, CrowdStrike, vpcFlow, Elk, Splunk, cloud storage sources, Tanium, ICS, SCADA, or Tenable), or other end user devices. The format of unlabeled data 130 may comprise a structured format, such as JSON, XML, or binary. In some examples, unlabeled data 130 is ingested by collecting, receiving, and storing the data generated by client device 140.

Third party device 150 is configured to perform secondary analysis on the data associated with client device 140. In some examples, third party device 150 corresponds with Security Information and Event Management (SIEM) that provides a secondary analysis of security alerts generated by detection system 102. In some examples, SIEM may combine the alerts from detection system 102 with other security event data to perform monitoring, detection, and response actions for potential anomalies.

In some examples, third party device 150 corresponds with a cyber stack system that includes tools and data inventory related to cyber security. In some examples, the cyber stack system may comprise a device to evaluate software security, a device to evaluate the security practices of the developers and suppliers, and a device to analyze and provide feedback with respect to conforming the data/devices with secure practices.

Figure 2:
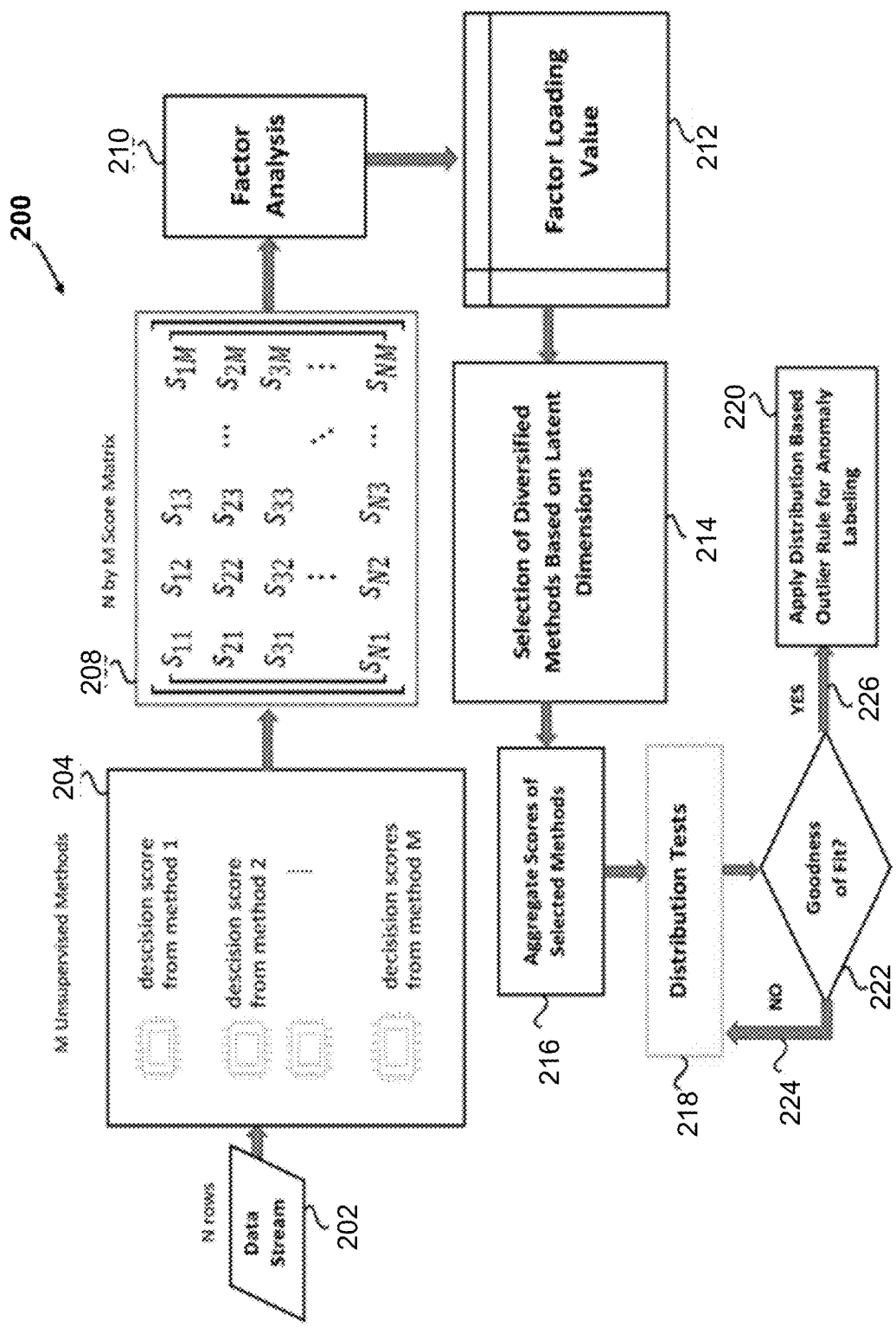
FIG. 2 is a diagram showing a logical architecture for analyzing data flows associated with an unsupervised algorithm for labeling for anomaly detection, in accordance with some of the embodiments disclosed herein.

FIG. 2 is a diagram of a logical architecture 200 for analyzing data flows associated with an unsupervised algorithm for labeling network anomalies. The logical architecture 200 for unsupervised labeling of potentially anomalous data for anomaly detection, which includes receiving a number N of computer network data communication flow records 202. In some examples, the process performed by the logical architecture 200 is repeatedly executed for a next set of N flow records. For example, the process performed by the logical architecture 200 is repeated to occur every 250-500 milliseconds or less. Also, in some embodiments filtering flow records 202 is utilized to receive only flow records that are unlabeled into the unsupervised algorithms employed by logical architecture 200. Thus, receiving the N of computer network data communication flow records 202 can include receiving only unlabeled flow records. Alternatively, in some embodiments, substantially all network flow records passing through a network information technology infrastructure are subjected to the process performed by the logical architecture 200.

Thereafter, a number M of unsupervised learning methods 204 are applied to each of the N computer network data communication flow records. A score is received for each of the N network data communication flow records from each of the M unsupervised learning methods. Subsequently, these scores are assembled into a N by M matrix 208. A factor analysis operation 210 can performed which involves factoring the N by M matrix 208 to determine the subsets of unsupervised learning methods as factors, wherein each subset of the unsupervised learning method represents a latent dimension of the data. Next, a factor loading value operation 212 is performed where each subset of unsupervised learning methods is weighted respectively according to a factor loading value of the unsupervised learning method. The weighting is executed in order to derive a respective final score for determining an anomaly in the subset of the network data communications. The weighting can be improved based on the historical performance of an individual unsupervised learning method. One unsupervised learning method per subset (also referred to as a latent dimension) is selected in a selection of diversified methods operation 214 to produce an aggregation of the final scores of the selected unsupervised learning methods 116. Subsequently, one or more distribution tests 218 can be performed on the final scores to identify anomaly probabilities according to respective distributions. A list of flow records represented by the distribution is output to an output cache. The network data communication flow records represented by the distribution, and indicated in the list, are designated/ labeled as anomalous flows.

A conditional check operation 222 is performed to determine whether each of the one or more distribution tests 218 meet a goodness of fit criterion. If the conditional check operation 222 determines that the goodness of fit does not meet the criterion, then a flow 224 returns back to perform the one or more distribution tests 218 on the next final score. Alternatively, if the conditional check operation 222 determines that the goodness of fit does meet the goodness of fit criterion, then the distribution may be passed by flow 226 to output the list of flow records represented by the distribution 220 to the output cache. For example, a distribution-based outlier rule for anomaly labeling is applied. The distribution may typically correspond to one of the latent dimensions. Accordingly, applying the distribution outlier rule to the distribution corresponding to the latent dimension includes labeling distribution of anomalous flow records.

Figure 3:
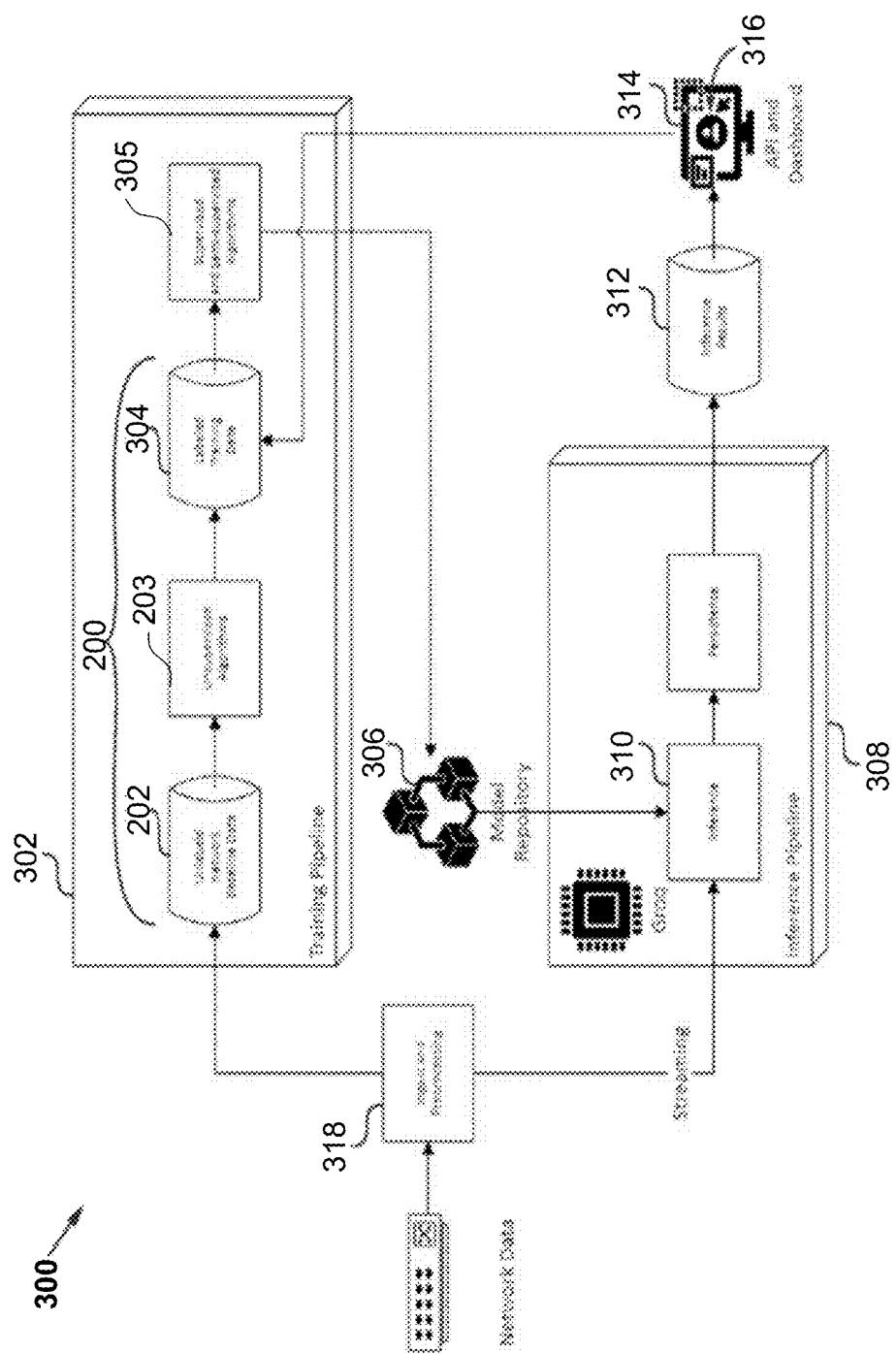
FIG. 3 is a diagram showing a logical architecture for analyzing data flows associated with supervised and semi-supervised labeling and inference for anomaly detection, in accordance with some of the embodiments disclosed herein.

FIG. 3 is a diagram of a logical architecture for analyzing data flows associated with supervised and semi-supervised labeling and inference of anomalous network data communications. Referring to FIG. 2 and FIG. 3, a training pipeline 302 receives a data stream 202 shown in FIG. 3 as unlabeled network data and performs an unsupervised algorithm 203 for labeling network anomalies as described in detail with respect to FIG. 2, and outputs a labeled training data into a model repository 306. As shown in FIG. 3, the training pipeline 302 includes the unsupervised process 200 (e.g., process performed by the logical architecture 200 in FIG. 2) and supervised and semi-supervised algorithms 305. The supervised and semi-supervised algorithms 305 receive labeled training data 304, which can be output that was labeled as a result of the unsupervised process 200, and then processes this data to determine flow record metadata for each flow record that was labeled as anomalous and adds the anomalous flow record to labeled training data models. According to an embodiment, an inference pipeline 308 receives data as a stream, performs inference with inference algorithms 310 based on the labeled training data models from the model repository 306 (generated by the supervised and semi-supervised algorithms 305), and outputs inference results 312. The inference results 312 may be output via an application programming interface (API) to a dashboard graphical user interface (GUI) for display to a network security analyst on a supervisory computer 312 including an electronic display 316. According to the embodiments, the outputs from both the process performed by the logical architecture 200 (shown in FIG. 2) and the process performed by the logical architecture 300 are ultimately employed to implement the various features of the anomaly detection system, described in greater detail above in reference to FIG. 1.

According to an embodiment, the logical architecture 300 performs outputting at least one flow record designated anomalous by displaying the GUI on electronic display 312, the GUI presenting an indication of the at least one anomalous flow record for viewing by a network analyst for supervised label verification. In some examples, the logical architecture 300 utilizes supervised and semi-supervised algorithms 305 to determine flow record metadata for each anomalous flow record of the distribution. Thus, the anomalous flow record may be added to a data labeled model in the model repository 306. Furthermore, in some examples, the logical architecture 200 (shown in FIG. 2) and logical architecture 300 can scan at least a large majority of network traffic for flow records meeting the anomalous flow record metadata and segregating flow records characterized by the anomalous flow record metadata as a function of the anomaly detection systems and methods described herein. Thus, logical architecture 300 can perform matching one or more character strings previously associated with an anomalous flow record to identify a new instance of an anomalous flow record. In some embodiments, the process executed by the logical architecture 200 (shown in FIG. 2) and the process executed by the logical architecture 200 are performed in parallel, for instance by a plurality of processor cores.

Figure 4:
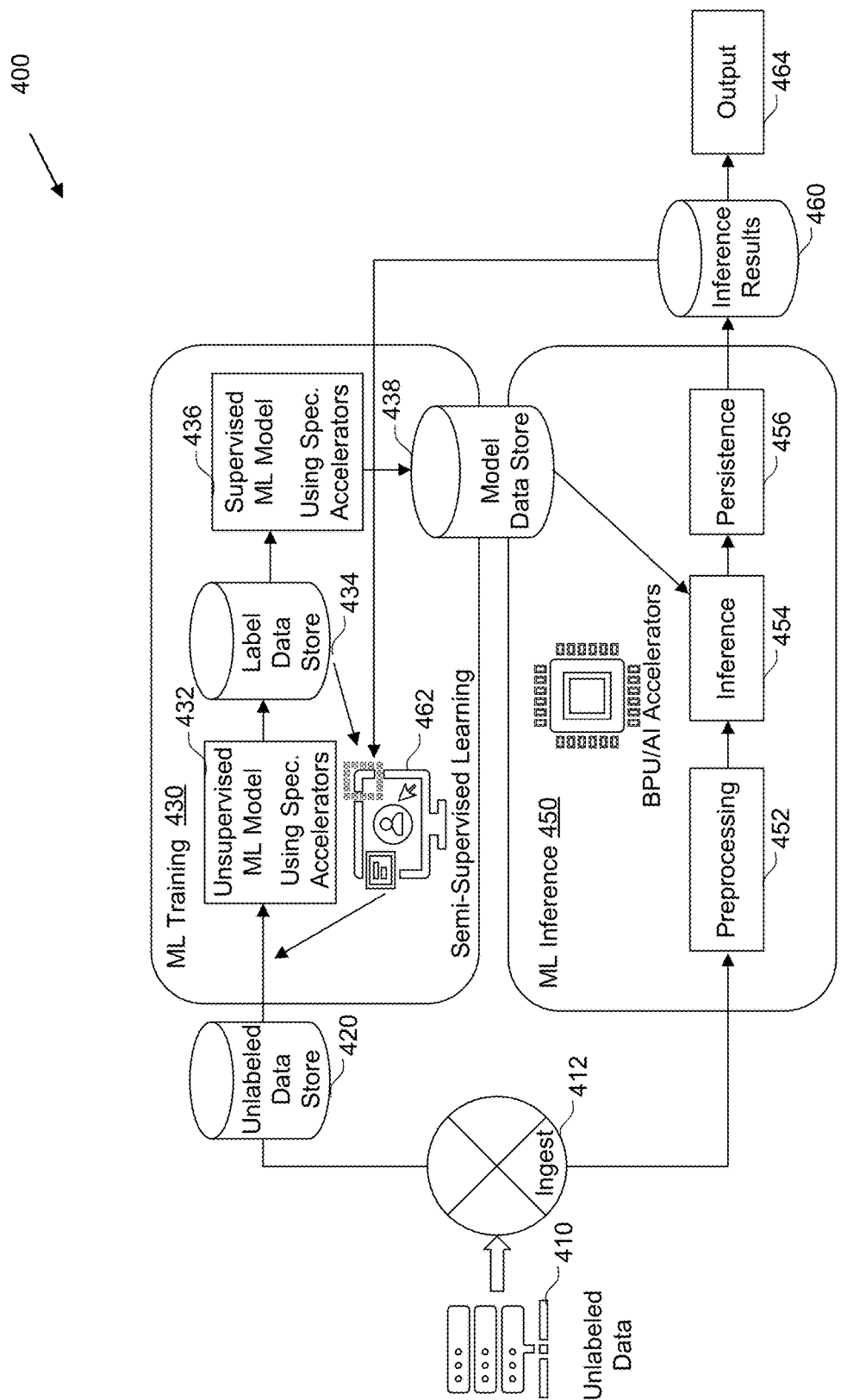
FIG. 4 is a diagram showing a logical architecture for performing anomaly detection, in accordance with some of the embodiments disclosed herein.

FIG. 4 is a diagram showing a logical architecture for performing automated anomaly detection, in accordance with some of the embodiments disclosed herein. In example 400, detection system 102 of FIG. 1 may execute machine-readable instructions to perform the operations described herein.

In some examples, specialized hardware is provided to execute one or more of the blocks illustrated herein. For example, the processes described herein may be implemented across multiple servers and using multiple architectures. In some examples, different accelerators and different hardware may be implemented to expedite processing.

At block 410, unlabeled data is received. The unlabeled data may include data from a client device, including end user devices, sensors, or software systems. The data may comprise various telemetry data, including streaming or batched data. The unlabeled data may correspond with remote measurement and transmission of information about the client device and, in some examples, may include information about the performance, security, status, and behavior of the client device. In some examples, the unlabeled data may include a data packet header, payload, or metadata that is added during the transmission of the data. In this sense, the data packet header, payload, or metadata that is added during the transmission of the data may not correspond with the label added later in the process (e.g., at block 432).

In some examples, the data may be generated by the client device by a sensor, IoT device, server, network equipment, or application associated with the client device. The source of the data may comprise sensors, IoT devices, satellite, third party entities, or other end user devices. In some examples, the source of the data may continuously generate the data. The transmission of the data may be transmitted using different protocols like HTTP, MQTT, or custom protocol.

At block 412, unlabeled data is ingested. For example, when the unlabeled data is telemetry data, the ingesting may include collecting, receiving, and incorporating raw data generated by the client device. The unlabeled data may include information regarding the performance, status, and behavior of these systems. The ingesting process may include storing the data in an unlabeled data repository or data store.

In some examples, the ingesting process may include a data acceptance and validation process to help ensure that incoming data is accurate, reliable, and consistent before the data are stored in the unlabeled data repository or data store. For example, the process may verify that the data adheres to predefined criteria, like data format, data type, and expected size. In another example, the integrity of the data may be analyzed to determine whether the data are altered or corrupted during transmission or storage. This may include checking for checksums, digital signatures, or hashing algorithms to verify data integrity. In other examples, the data are checked against predefined standards or schema to ensure that it aligns with the expected format, structure, and content, including a comparison to specific data models or industry standards.

In some examples, the ingesting process may include filtering, aggregation, and transformation. For example, filtering of the unlabeled data may remove specific subsets of data based on predefined criteria, like specific values, ranges, patterns, or characteristics within the unlabeled data. In another example, aggregation may combine information from multiple individual data points in the unlabeled data by summing, averaging, counting, or finding maximum or minimum values within groups or categories in the unlabeled data. In some examples, the unlabeled data may be converted to a different data type or protocol/format or added with missing values.

In some examples, the ingesting process may identify discrepancies or issues in the unlabeled data. The issues may be added to an audit log and may trigger an action (e.g., to retransmit the unlabeled data or restart the client device).

At block 420, ingested data is stored in the unlabeled data repository or data store. In some examples, the unlabeled data may be used as baseline data for multiple ML training processes (block 430). The unlabeled data may correspond with data received from the client device and labeled, at a first time, using the unsupervised machine learning model.

At block 430, the unlabeled data is used to train one or more machine learning models using a multi-step training process. The ML training may be performed asynchronously with receiving the unlabeled data. In some examples, the training process comprises blocks 432, 434, 436, or 462, or any subset thereof.

At block 432, an unsupervised machine learning model is initiated. For example, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with the data characteristic. When dimensionality reduction is implemented, the process may reduce the number of input variables or features under consideration to simplify the complexity of the dataset by transforming it into a lower-dimensional space while preserving important information. The reduction in the complexity of the dataset may help identify fewer labels by the unsupervised machine learning model. When association rule learning is implemented, the process aims to discover relationships, patterns, or associations within the unlabeled data, and generate a label for the corresponding data.

The unsupervised machine learning model may be trained on unlabeled data (received from block 420) to assign or generate a label for the unlabeled data. The unlabeled data may be received without labeled outputs or target variables. In an illustrative example, the label may correspond with "1" (e.g., outlier data) or "0" (e.g., normal data) based on the characteristics of the data. The label determined during the training process may be stored in a label data store (block 434).

In some examples, the unsupervised machine learning model may identify new data types that are included with the unlabeled data from the client device. When new data is identified (e.g., when the characteristics of the data do not match pre-existing data characteristics that are previously assigned to labels), a new or second label may be generated and assigned to the unlabeled data. The label that is generated during the training process may be stored in label data store (block 434).

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

At block 434, the labeled training data is generated by the unsupervised machine learning model at block 432 and stored in label data store.

At block 436, a training of a supervised machine learning model is initiated. For example, the supervised machine learning model may be trained using the label that was determined from the unsupervised machine learning model and stored in label data store (block 434).

In some examples, the supervised machine learning model may correspond with linear regression, decision trees, support vector machines, neural networks, or other supervised machine learning models. Training the supervised machine learning model may begin by initializing the model with random or predefined parameters that can be adjusted during the training. When the label that was determined from the unsupervised machine learning model is provided as input to the supervised machine learning model (e.g., by accessing label data store 120), the process iteratively adjusts parameters of the model to minimize the difference between predictions and the true labels. In some examples, a loss function may also be implemented to quantify the error between the predicted outputs and the true labels. The loss function may be minimized during training.

In some examples, an optimization function is implemented to adjust the parameters of the model iteratively. An illustrative process is gradient descent, although various optimization functions may be implemented. In some examples, the gradient of the loss function may be calculated with respect to the model parameters. The parameters may be updated in the opposite direction of the gradient to minimize the loss. The ML training module may output a trained ML model to model data store 438. The trained machine learning model may be used during an inference phase of the machine learning model when new unlabeled data is received.

At block 450, an inference process may be initiated using the trained machine learning model. In some examples, the data is used to infer anomalies or threats and to help implement automated anomaly detection. In some examples, the inference process comprises blocks 452, 454, and 456, or any subset thereof.

At block 452, the inference process may implement preprocessing of the data. For example, after the unlabeled data is ingested (block 412), the data may be partitioned and provided for preprocessing. The ingesting/preprocessing may remove specific subsets of data based on predefined criteria, combine information from multiple individual data points in the unlabeled data, or convert the data to a different data type or protocol/format or added with missing values. In some examples, the data may be split so that a first portion of the data is used for training (e.g., with block 430) and a second portion of the data is used for inference (e.g., with block 450).

Various preprocessing methods may be implemented. For example, the inference process may implement feature scaling to adjust the scale of the features to correspond to a similar range as each other. In some examples, the preprocessing includes dimensionality reduction to reduce the number of input features while preserving important information. The identification and reduction of input features may be implemented using PCA (Principal Component Analysis) or other feature selection methods. In some examples, the inference process normalizes the data from the ingesting process (block 412) to help ensure that the incoming data is in the same format and range as the data used during model training (block 430).

In some examples, the preprocessing may generate new data using oversampling, undersampling, or using weighted classes to handle imbalanced data. The imbalanced data may exist in the distribution of clusters or other groupings of data. The newly generated data may help prevent biased inferences as output (block 460).

At block 454, inference may be initiated by accessing one or more supervised ML models stored in model data store 438 and providing the data received from preprocessing (block 452) as input. The model may generate a set of clustered data in accordance with the labels that were determined by the unsupervised machine learning model.

The label associated with the data may be used to access a corresponding supervised ML model stored in model data store 438. As one illustrative example, particular telemetry data may be associated with a particular model stored in model data store 438. When new telemetry data is received that is similar to the previously received telemetry data, the new telemetry data may also be associated with the particular model stored in model data store 438 and the new data may be provided as input to the ML model.

At block 456, the process may initiate a persistence process. The learned parameters, weights, structure, or other relevant information can be accessed from model data store 438 and correlated with the output from inference process at block 454. Upon completion, the ML model may retain the state it achieved after training, including the learned parameters that were optimized during the training process.

At block 460, the inference results/output may be stored in a data store and, in some examples, initiate a label auditing process. During the label auditing process, the process may update labels associated with particular data or data characteristics. For example, the data associated with the label may be measured for similarity. The data value that is greater than a predetermined similarity threshold value may be provided for further review. In some examples, additional labels may be added by a human user to output from the supervised machine learning model.

In some examples, the labels that are determined during the label auditing process may be provided back to a supervised machine learning model (block 462) to retrain the unsupervised machine learning model during a second training process (block 432). The retrained supervised machine learning model may be stored in model data store (block 438) and/or provided for future inference processes on new data. The output from the label auditing may be used to implement automated detection of anomalies or potential threats. The newly-discovered potential threats may be provided to a supervised machine learning module (block 462) for analysis and inclusion in the ML model.

At block 462, the unsupervised machine learning model may be retrained with the labels identified during the label auditing process that may correspond with the fraudulent activity. The retrained model may be updated at block 432. Using the retrained model, any new data that is received/ingested may be received by unsupervised machine learning model. The pre-existing labeled data can be clustered with the previously-identified clusters and any new data that is not clustered can be identified as a new outlier.

At block 464, an action may be initiated. For example, in response to detecting an anomaly or threat or unpermitted access to the client device in the data, the action may correspond with remediating the anomaly. In some examples, the action may refer to the steps taken to mitigate or eliminate a network threat once it has been identified, which can provide a technical improvement for the system overall. The system may respond quickly to a network threat to improve cybersecurity, minimize potential damage, and potentially prevent further compromise.

In some examples, the action may comprise initiating an isolation of the affected systems to prevent the threat from spreading further. This might involve disconnecting or transmitting an alert to recommend disconnecting the compromised client device from the network. In other examples, the action may implement network segmentation to separate or contain the impact of the detected anomaly or threat.

The action may comprise a recommendation to initiate an investigation to understand the nature and scope of the anomaly. The action may involve analyzing data/security logs, network traffic, or other sources. The investigation may help identify the source, methods, and potential impact of the threat. In other examples, the investigation may help determine the vulnerabilities that allowed the anomaly or threat to access the client device. For example, the action can identify outdated software, misconfigurations, or other weaknesses in the network infrastructure, suggest updating patches or security tools, changing access credentials, or other actions in response to the anomaly or threat.

In some examples, the action may include updating an application programming interface (API), dashboard, or other display. Various examples of the API, dashboard, or display are provided with FIGS. 7-10.

Figure 5:
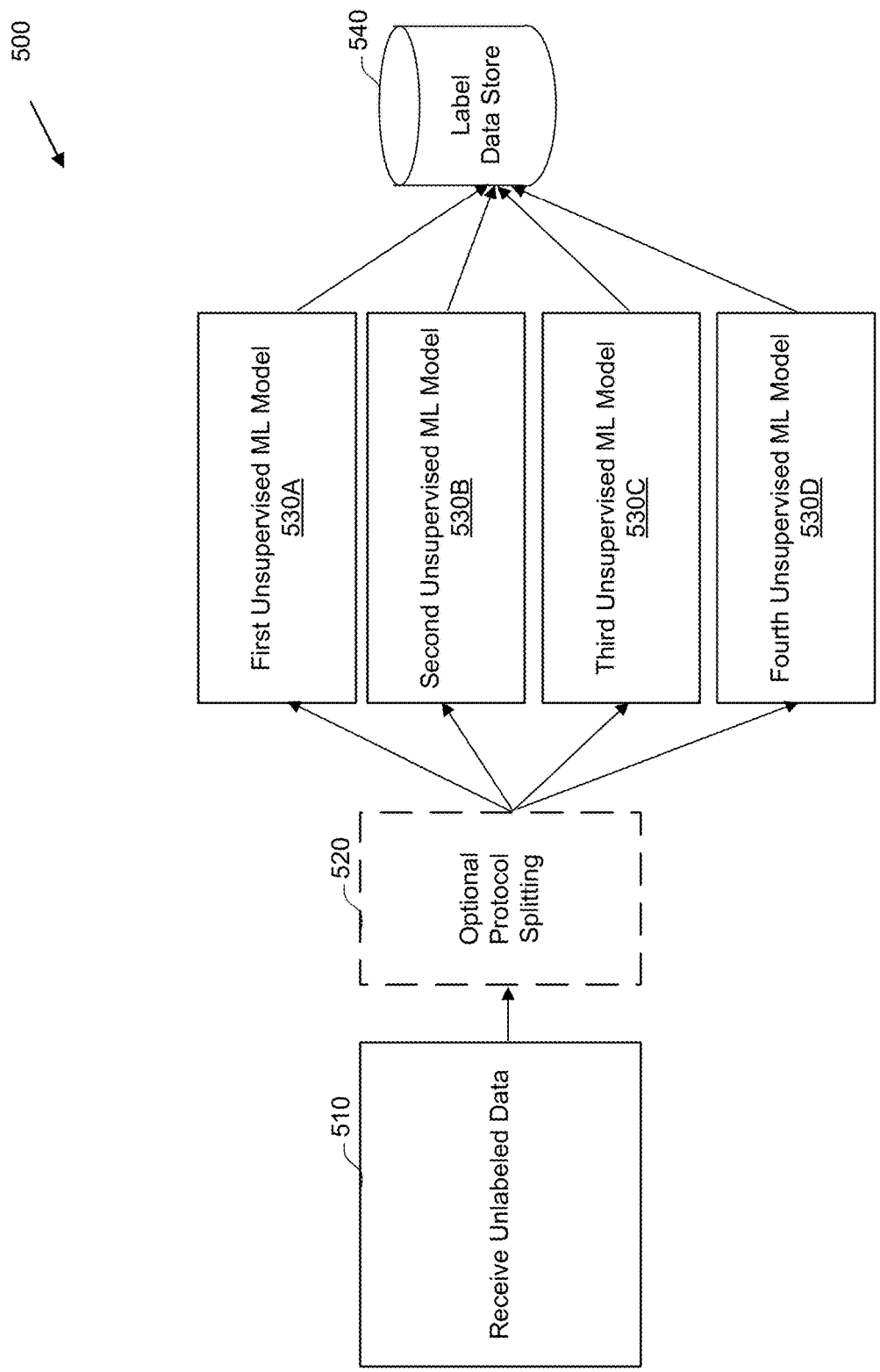
FIG. 5 is an illustrative process of unsupervised machine learning model for generating labeled training data for a supervised machine learning model, in accordance with some of the embodiments disclosed herein.

FIG. 5 is an illustrative process of unsupervised machine learning model for generating labeled training data for a supervised machine learning model, in accordance with some of the embodiments disclosed herein. In example 500, detection system 102 illustrated in FIG. 1 may execute machine-readable instructions to perform the operations described herein.

At block 510, the unsupervised machine learning model may receive unlabeled data from the client device, as described herein.

At block 520, when the unlabeled data is associated with telemetry data, the process may define the codec associated with the data and initiate an optional protocol splitting process. The codec or other algorithm used to compress and decompress the data for transmission, storage, or playback, may be determined, including an audio codec (e.g., MP3, AAC, or FLAC), video codec (e.g., H.264, H.265 or HEVC, VP9, or AV1), or image codec (e.g., JPEG, PNG, or WebP).

In some examples, the unlabeled data may be associated with a predefined codec in order to associate the unlabeled data with a particular unsupervised machine learning model. In other examples, the data label may correspond with the codec or other data characteristic. One or more unsupervised machine learning models may be trained and stored for each type of codec or label.

At block 530, various unsupervised machine learning models may be stored and used to determine the data label for the unlabeled data. The determination of the particular unsupervised machine learning model may be matched with the codec (e.g., when the data is telemetry data) or other data characteristic. In this illustration, a set of unsupervised machine learning models are stored in model data store, including a first unsupervised machine learning model 530A, second unsupervised machine learning model 530B, third unsupervised machine learning model 530C, and fourth unsupervised machine learning model 530D.

In some examples, the unsupervised machine learning model may determine whether the data is normal data or outlier data. In determining the normal data and the outlier data, the unsupervised machine learning model may compare a set of data characteristics of normal data to the new, unlabeled data. At a first time, a first label of a set of labels may be assigned to the unlabeled data using an unsupervised machine learning model. This may correspond with normal data that is identified in a first set of unlabeled data. At a second time, second unlabeled data may be received. The second unlabeled data may be provided to a particular unsupervised machine learning model based on a data characteristic. When the data characteristic exists and is assigned to an existing unsupervised machine learning model, the particular unsupervised machine learning model may be selected to assign the label to the unlabeled data. The label may correspond with the first label of the set of labels that was assigned to the first labeled data. In this example, the same label may be assigned to the second unlabeled data because the unlabeled data may be similar to the first unlabeled data based on the set of data characteristics. This may also correspond with normal data that is identified in a second set of unlabeled data. When the data is not similar to the first unlabeled data or any corresponding data characteristics of the first unlabeled data, a second label may be generated and assigned to the second set of labeled data. The second label may be stored with the set of labels and correspond to a second set of the second unlabeled data that is not similar to the first unlabeled data based on the set of data characteristics.

In some examples, the unsupervised machine learning model may correspond with clustering (e.g., k-means, hierarchical clustering), dimensionality reduction (e.g., PCA, t-SNE), association rule learning, or other unsupervised machine learning models. When clustering is implemented, the process may identify natural groupings or clusters in the data, based on a data characteristic, and generate a label associated with that characteristic. When dimensionality reduction is implemented, the process may reduce the number of input variables or features under consideration to simplify the complexity of the dataset by transforming it into a lower-dimensional space while preserving important information. When association rule learning is implemented, the process aims to discover relationships, patterns, or associations within the unlabeled data, and generate a label for the corresponding data. In any of these instances, the unsupervised machine learning model may generate or assign a label that corresponds with "1" for outlier data and "0" for normal data.

The unsupervised machine learning models may be trained on unlabeled data to assign or generate a label for the unlabeled data. The unlabeled data may be received without labeled outputs or target variables. In an illustrative example, the label may correspond with "1" (e.g., normal data) or "0" (e.g., outlier data) based on the characteristics of the data. In another example, the label may correspond with multiple values, including a value associated with one or more data characteristics (e.g., non-binary label).

In some examples, the unsupervised machine learning model may identify new data types that are included with the unlabeled data from the client device. When new data is identified (e.g., when the characteristics of the data do not match pre-existing data characteristics that are previously assigned to labels), a new or second label may be generated and assigned to the unlabeled data.

In some examples, the unsupervised machine learning model may determine a new or second label associated with outliers in the data. The outlier may correspond with data that is not similar to previously identified activities in the system, including non-fraudulent or fraudulent activities, and a label corresponding with the outlier may be generated and assigned to the data.

In some examples, the determination of the particular unsupervised machine learning model may use an ensemble of models by including first unsupervised machine learning model 530A, second unsupervised machine learning model 530B, third unsupervised machine learning model 530C, and fourth unsupervised machine learning model 530D. Each of unsupervised machine learning models 530 may correspond with an ensemble of models. For example, when an anomaly detection ensemble is implemented, the unsupervised machine learning model may combine multiple anomaly detection algorithms or use different strategies to detect outliers in data. A data characteristic identified by the unsupervised machine learning model can be used as the data label. In some examples, ensemble and voting are implemented to generate and assign the labels.

At block 540, the label determined by the unsupervised machine learning model may be stored in a label data store. The data may comprise a set of labels and a set of characteristics associated with the unlabeled data.

Figure 6:
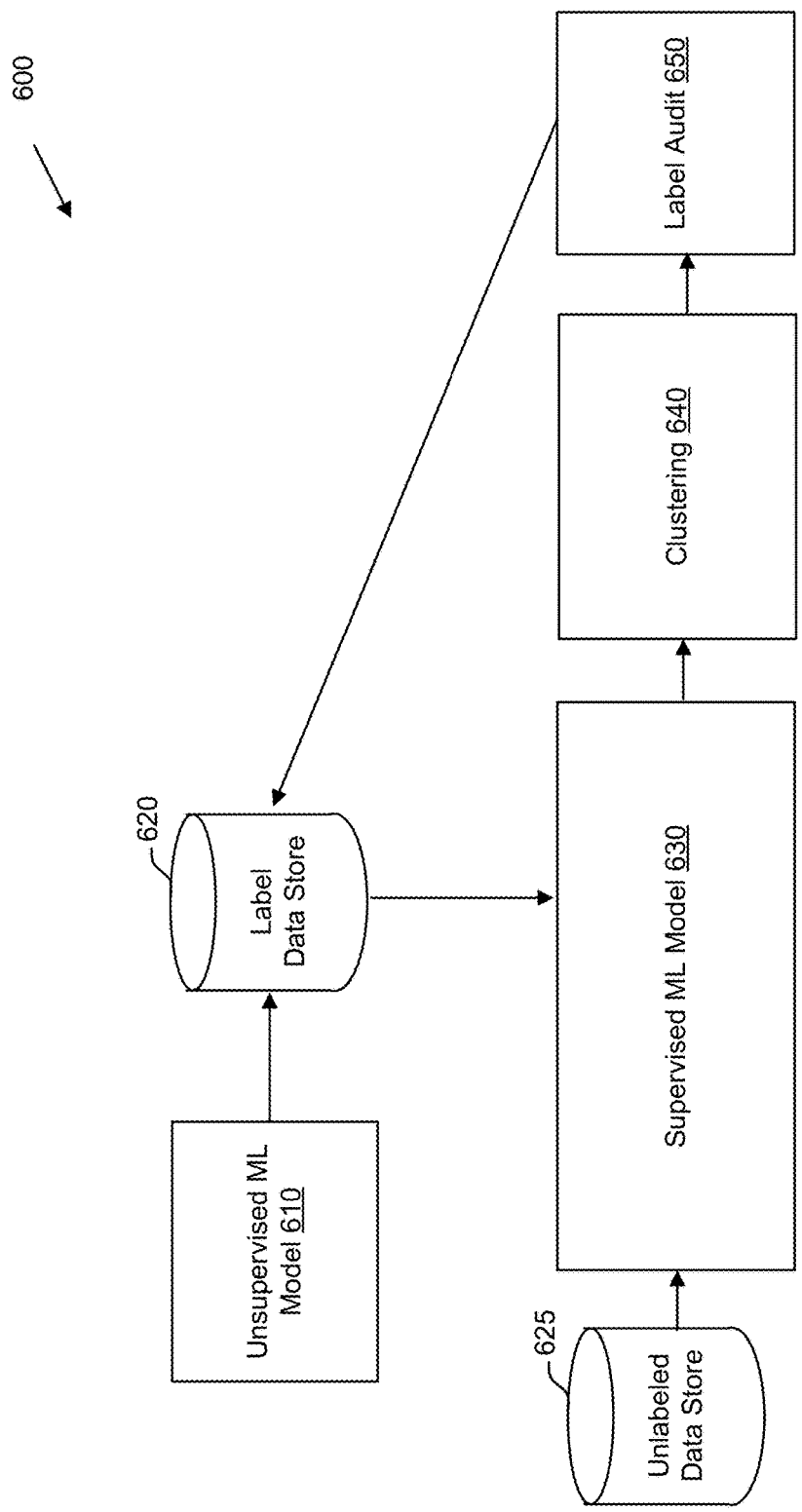
FIG. 6 is an illustrative inference process using a supervised machine learning model, in accordance with some of the embodiments disclosed herein.

FIG. 6 is an illustrative inference process using a supervised machine learning model, in accordance with some of the embodiments disclosed herein. In example 600, detection system 102 illustrated in FIG. 1 may execute machine-readable instructions to perform the operations described herein. In some examples, the unsupervised machine learning model may be trained to determined labels for unlabeled data from the client device, as described herein.

At block 610, the unsupervised machine learning model generates a set of labels. The labels may represent normal data and outlier data. For example, the label may correspond with "1" for outlier data and "0" for normal data.

At block 620, the label determined during the training process of the unsupervised machine learning model may be stored in label data store. The label may be accessed by the supervised machine learning model to cluster/group data (block 630) and/or may be updated by the label audit process (block 650).

At block 630, the supervised machine learning model may receive unlabeled data from the data repository/data store at block 625 as input during an inference process. When the data are received, the labels are generated/assigned using the unsupervised machine learning model and the supervised machine learning model is executed to cluster the new data in accordance with the labels that were determined by the unsupervised machine learning model.

In some examples, an ensemble of supervised machine learning models is implemented, which combines multiple models. For example, the supervised machine learning model may implement a Random Forest ensemble method that includes multiple instances of the same learning algorithm on different subsets of the training data to build diverse models. In another example, the supervised machine learning model may implement a voting process that includes combining predictions from multiple models and selecting the final output based on majority voting or a weighted averaging of individual model predictions.

At block 640, similar events identified in the unlabeled data (which has been assigned a label by the unsupervised machine learning model) may be clustered during the inference process using the supervised machine learning model. For example, the events that are associated with the first label that existed in the label data store may be considered normal data and the data that are associated with the second label that did not exist in the label data store may be considered outlier data.

At block 650, a label audit process may update the cluster/output of the supervised machine learning model. During the label auditing process, the data associated with the label may be measured for similarity. The data value that is greater than a predetermined similarity threshold may be provided for further review. The labels may be revised or added by human or automated input. In some examples, the data are provided to a display or real-time API to receive an interaction from the user to help relabel the clustered data.

The revised or added labels may be added back to the label data store (block 620) to initiate a second training process of the supervised machine learning model (block 630). The second training process may combine the labels generated/assigned from the unsupervised machine learning model and the label auditing process to generate an improved supervised machine learning model (block 630). The improved supervised machine learning model may be retrieved from the model data store and executed on new data during a future inference process of the new data.

Figure 7:
FIG. 7 is an example anomaly detection display, in accordance with some of the embodiments disclosed herein.

FIG. 7 is an example anomaly detection display, in accordance with some of the embodiments disclosed herein. In example 700, a display is illustrated with a data timeline and potential outlier data in association with automated anomaly detection. In some examples, detection system 102 illustrated in FIG. 1 may execute machine-readable instructions to generate the display.

At block 710, a data timeline is provided, which illustrates an amount of unlabeled data received from the client device and spikes in the data when outlier events may be identified. The timeline may be adjusted in time increments (e.g., 15 minutes, 1 hour, etc.) to illustrate the amount of data received from the client device by the detection system.

At block 720, a number of anomalies detected is provided in a numerical value format. The number of anomalies may correspond with a second label of the set of labels determined by the unsupervised machine learning model.

At block 730, a data label is provided at the display. The data label corresponds with the IP address or host name associated with the data packet. Each new instance of the data label that is included in the new data is repeated on the display as it is received from the client device. In this instance, the data label is repeated four times (blocks 730A, 730B, 730C, 730D).

At block 740, the confidence score is provided. In this example, the confidence score may correspond with the determination that the unlabeled data is outlier data. In other words, the unlabeled data corresponds with data that is previously unlabeled and not similar to other previously labeled data in the system. A correlation may exist between the confidence score and the determination of outlier data, including an instance when the data is not similar to existing data, a subsequent action is recommended to be performed (e.g., to remedy an anomaly or potential threat).

The confidence scores may be assigned to different colors in accordance with the likelihood that the data received from the client device are outlier data. For example, the data corresponding with a high likelihood that the data are an outlier (e.g., the data are not similar to a preexisting label) may correspond with the color red, the data corresponding with a medium likelihood that the data are an outlier may correspond with the color yellow, and the data corresponding with a low likelihood that the data are an outlier (e.g., the data are somewhat similar to a preexisting label) may correspond with the color green.

Figure 8:
FIG. 8 is an example anomaly detection display, in accordance with some of the embodiments disclosed herein.

FIG. 8 is an example anomaly detection display, in accordance with some of the embodiments disclosed herein. In example 800, a display is illustrated with a relabeling queue associated with a label audit process and potential outlier data in association with automated anomaly detection. In some examples, detection system 102 illustrated in FIG. 1 may execute machine-readable instructions to generate the display.

At block 810, a relabeling queue timeline is provided. In the relabeling queue timeline, true anomalies and false positive anomalies are provided in a chart with respect to the time each data is received during a measured time period.

At block 820, a number of anomalies detected is provided in a numerical value format. The number of anomalies may correspond with a second label of the set of labels determined by the unsupervised machine learning model.

At block 830, a data label is provided at the display. The data label corresponds with the IP address or host name associated with the data packet. Each new instance of the data label that is included in the new data is repeated on the display as it is received from the client device. In this instance, the data label is repeated three times (blocks 830A, 830B, 830C). In this example, the identification of whether the data is a true anomaly or a false positive anomaly are provided as well. The data may be confirmed as an anomaly and correspond with a data characteristic that is not previously identified and labeled by the system.

At block 840, the confidence score is provided. The confidence score in this example is similar to the confidence score provided in FIG. 7 and repeated herein.

Figure 9:
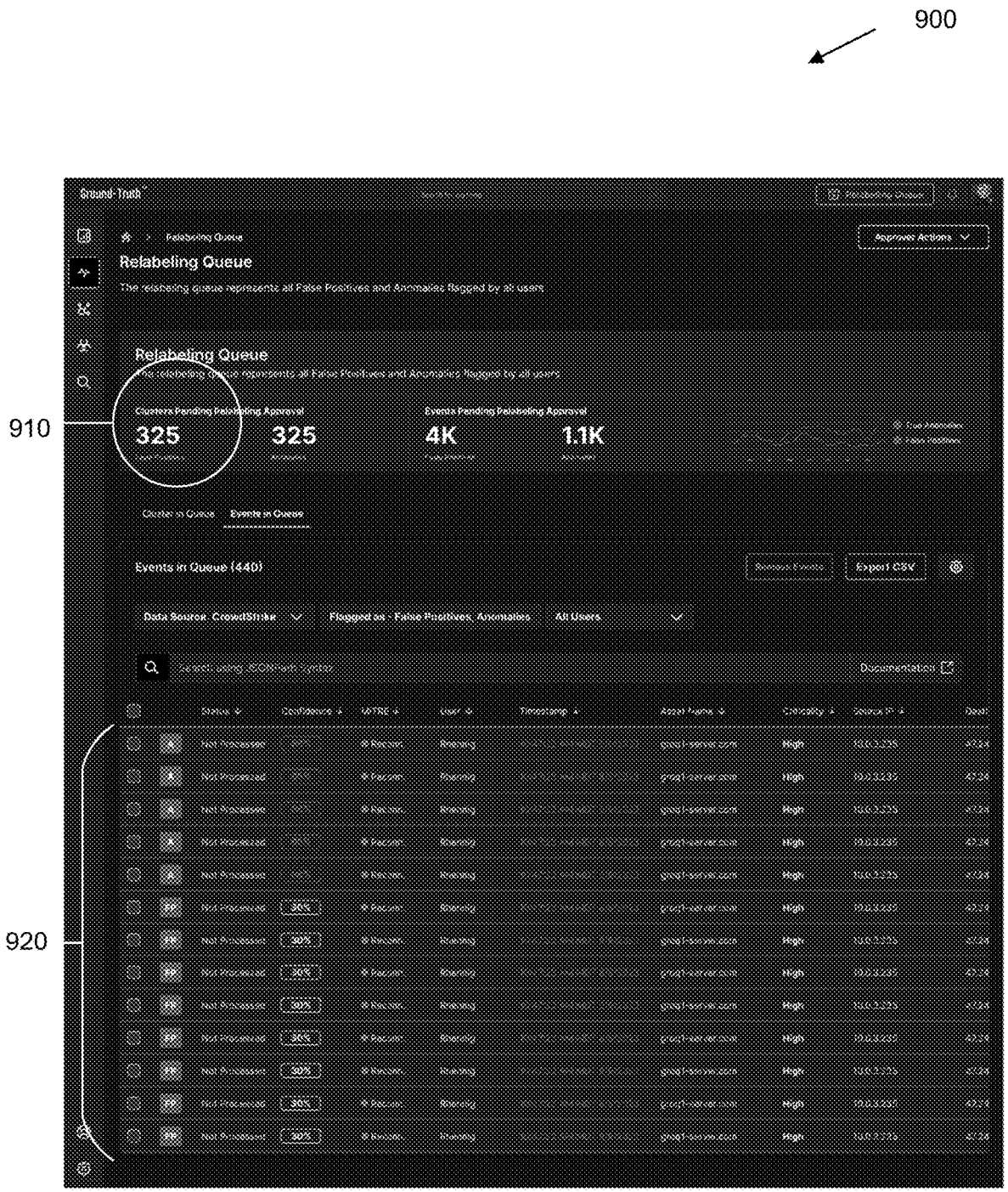
FIG. 9 is an example anomaly detection display, in accordance with some of the embodiments disclosed herein.

FIG. 9 is an example anomaly detection display, in accordance with some of the embodiments disclosed herein. In example 900, a display is illustrated with a relabeling queue associated with a label audit process and potential outlier data in association with automated anomaly detection. In some examples, detection system 102 illustrated in FIG. 1 may execute machine-readable instructions to generate the display.

At block 910, a number of anomalies detected is provided in a numerical value format. The number of anomalies may correspond with a second label of the set of labels determined by the unsupervised machine learning model.

At block 920, individual entries of the relabeling queue are provided. Additional data provided in association with the data label that is not similar to previously assigned data labels is also provided. For example, additional data may include a status (processed or not processed), confidence score (with red/yellow/green label), timestamp that the data was received from the client device, criticality, source IP address (identifying a client device).

FIG. 10 is an example anomaly detection display, in accordance with some of the embodiments disclosed herein. In example 1000, a display is illustrated to show the location of the client device and label that potentially corresponds with outlier data. In some examples, detection system 102 illustrated in FIG. 1 may execute machine-readable instructions to generate the display.

At block 1010, the individual entries of the relabeling queue are provided. Additional data provided in association with the data label that is not similar to previously assigned data labels is also provided. For example, additional data may include a source IP address, destination IP address, source port, destination port, protocol (e.g., SSH), bytes of data, and timestamp that the data was received from the client device.

At block 1020, the display may provide an interaction tool during the label audit process. During the label auditing process, the display may allow an interaction with the individual label. When an interaction is received (e.g., "yes, this data is properly labeled" or "yes, this data corresponds with a threat"), the process may use the interaction response to revise labels associated with particular data or data characteristics. In some examples, the interaction response is received from a human user and the updated label is provided to retrain the supervised machine learning model.

Figure 11:
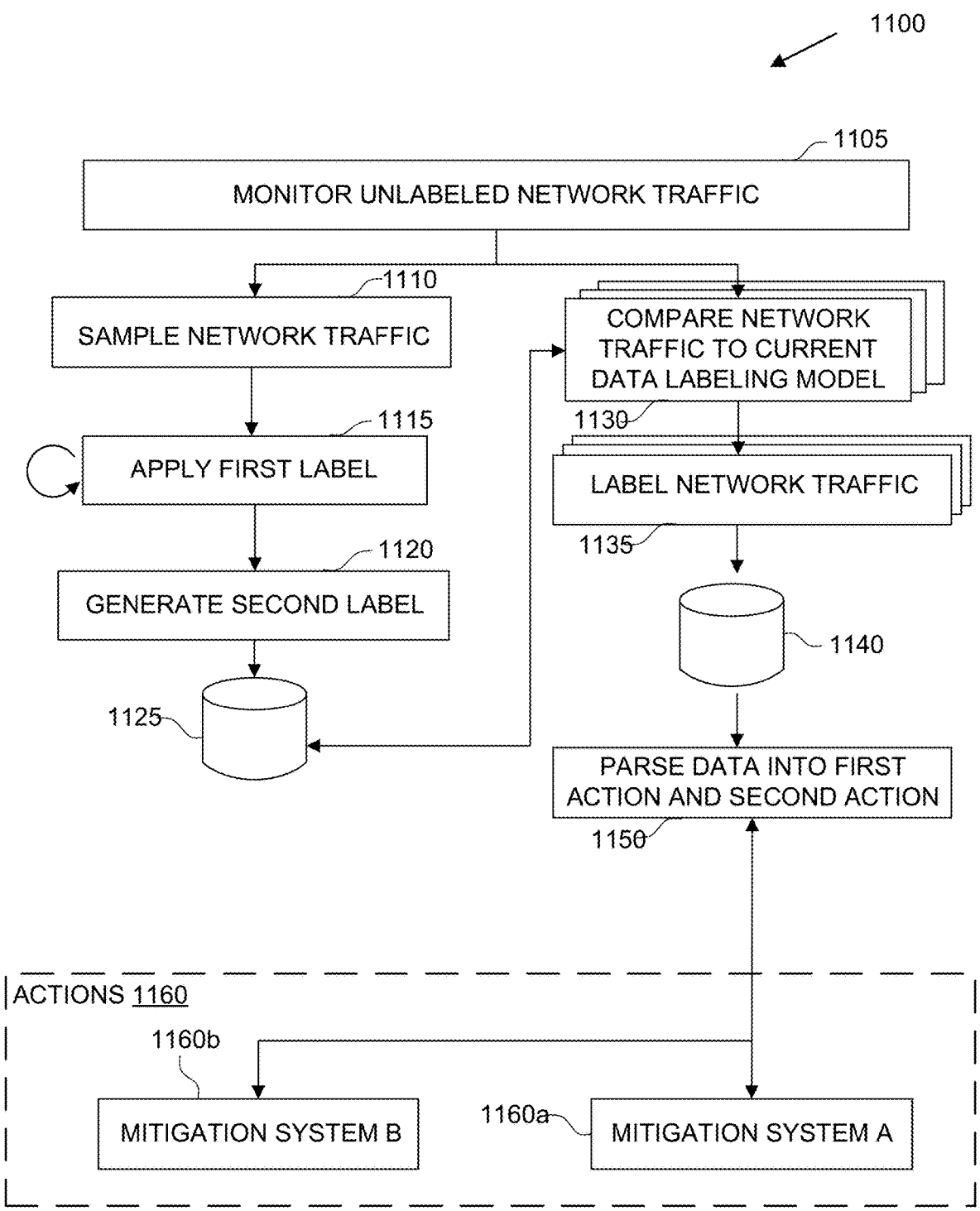
FIG. 11 is a diagram showing a computer method and database connections for monitoring network anomalies, in accordance with some of the embodiments disclosed herein.

FIG. 11 illustrates a computer method and database connections for monitoring network anomalies or threats, according to an embodiment. In example 1100, In some examples, detection system 102 illustrated in FIG. 1 may execute machine-readable instructions to perform the operations described herein.

At block 1105, unlabeled data is monitored in network traffic communications transmitted across the computer network. The process may proceed to block 910 or block 930.

At block 1110, a portion of the computer network data transmissions may be received and sampled by detection system 102 of FIG. 1. Receiving the portion of computer network data transmissions may include sampling the unlabeled network traffic communications. The sampling may include less than the entirety of computer network data transmissions. The computer network data transmissions may be characterized by metadata. In some examples, the training portion may introduce latency into the sampled data transmissions. The sampling, or using less than the entirety of the data, may allow the network as a whole to provide low latency data communications by bypassing the training portion of the method. The process may proceed to block 1115.

At block 1115, a first label may be applied. The first label may be similar to a label assigned to previously-received data, which identifies that the data are similar or comprise similar data characteristics. In some examples, labeling may be derived. For example, an anomaly or anomaly or threat labeling model as a function of data transmission parameters to produce a data labeling model. Block 2 915 may be included in a portion of the process 1100 characterized as "training".

In some examples, deriving the anomaly or threat labeling model as a function of data transmission parameters is performed without human supervision and may be performed continuously. In some examples, performing the comparison of the computer network data transmissions to the transmission labeling model is performed at least partly by a quantum or quantum-inspired computer.

In some examples, deriving the anomaly or threat labeling model as a function of data transmission parameters to produce a data labeling model may include comparing the data transmissions to previously labeled data transmissions, and identifying data transmission metadata that match attributes of the previously labeled data transmissions. For example, the previously labeled data transmissions may include data transmissions previously characterized as Denial of Service (DOS), Remote to User (R2L), User to Root (U2R), and Probing (Probe). The process may proceed from block 1115 to block 1120.

At block 1120, the data labeling model may be updated. The labels may be updated in label data store 1125. Updating the data transmission labeling model 1125 to create a current data transmission labeling model. The process may proceed to block 1130.

At block 1130, network traffic may be compared to the data labeling model. The network traffic may comprise the computer network data transmissions, which can be compared to the data transmission labeling model.

Labeling, with the second server computer, the computer network data transmissions corresponding to the data labeling model in step 1135 may be performed as a function of the comparison of the computer network data transmissions to the data transmission labeling model performed in step 1130.

In some examples, performing the comparison of the computer network data transmissions to the transmission labeling model in step 1130 is performed at least partly by a quantum or quantum-inspired computer.

Comparing the computer network data transmissions to the data transmission labeling model, in step 1130, may be performed on all or a majority of computer network data transmissions. This is in contrast to generating the data labeling model, in step 1115, being performed using a sample of the computer network data transmissions.

At block 1135, a second server computer labels computer network traffic corresponding to the data labeling model to produce a population of anomaly-labeled computer network traffic.

The anomaly-labeled computer network traffic may be stored in network traffic data store 1140 carried by a non-transitory computer readable medium. Block 1135 may be included in a portion of the process 1100 characterized as "inference". The process may proceed to block 1150.

In some examples, the process comprises displaying on an electronic display, with the server computer, a graphical user interface for presentation to a user (not shown) and receiving, from the user via the graphical user interface, a command to derive the anomaly or anomaly or threat labeling model (not shown). The method 1100 may further include deriving, with the server computer or the second server computer, a representation of threat identification outcome; and displaying on the electronic display, with the server computer or the second server computer, the representation of anomaly or threat dentification outcome.

In some examples, labeling the computer network traffic corresponding to the data labeling model (using label data store 1125) to produce the population of anomaly-labeled computer network traffic (using network traffic data store 1140) includes performing a plurality of processes with a quantum or quantum-inspired computer.

In some examples, labeling the computer network traffic corresponding to the data labeling model (using label data store 1125) to produce the population of anomaly-labeled computer network traffic (using network traffic data store 1140) includes converting the data corresponding to unlabeled computer network traffic to a quadratic unconstrained binary optimization (QUBO) problem with a solver program running on the second server computer. The QUBO problem may be served to the quantum or quantum-inspired computer a plurality of times by the solver program. The solver program may combine a plurality of QUBO solutions received from the quantum or quantum-inspired computer to label the computer network traffic. The data labeling model may be converted to one or more QUBO penalty functions by the solver program.

At block 1150, anomaly-labeled network traffic may be parsed into a first action and a second action. Once the data are parsed, the respective sub-populations of anomaly-labeled network data transmissions may be provided to initiate one or more actions 1160. The actions may correspond with transmitting alerts/notifications to various anomaly or threat mitigation systems (illustrated as first mitigation system 1160a and second mitigation system 1160b) or initiating remote processing at these systems. The parsing may be performed to deliver the respective sub-populations of anomaly-labeled network data transmissions to the one or more anomaly or threat mitigation systems 1160a, 1160b.

Figure 12:
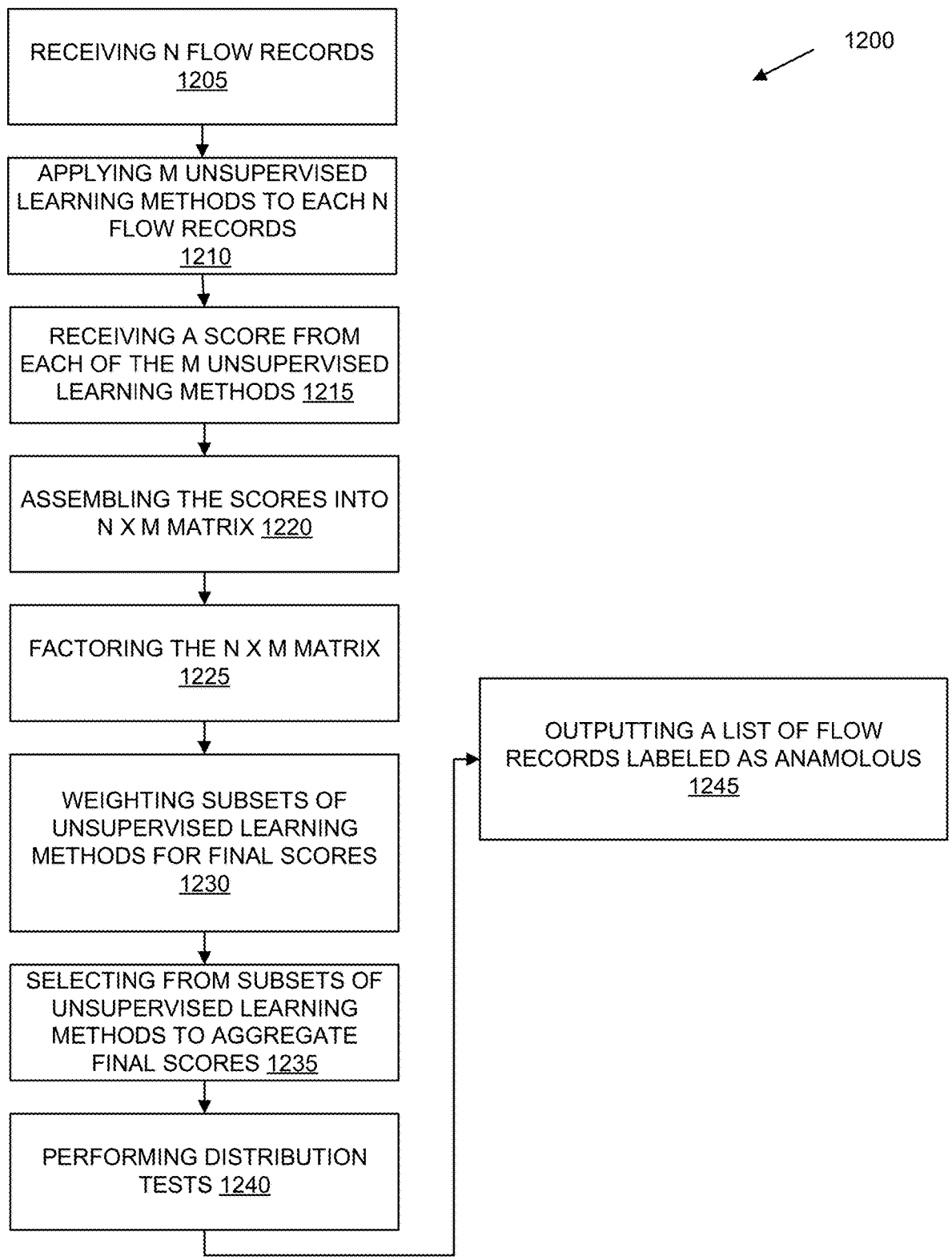
FIG. 12 is a process for analyzing data flows associated with an unsupervised algorithm for labeling for anomaly detection, in accordance with some of the embodiments disclosed herein.

FIG. 12 is a process for implementing unsupervised labeling of potentially anomalous data for anomaly detection, in accordance with some of the embodiments disclosed herein. In example 1200, detection system 102 illustrated in FIG. 1 may execute machine-readable instructions to perform the operations described herein.

At block 1205, a number N of computer network data communication flow records are received. In some examples, the process 1200 is repeatedly executed, in an iterative manner, for a next set of N flow records. For example, the process 1200 is repeated to occur every 250-500 milliseconds or less. Also, in some embodiments block 1205 involves filtering flow records to receive only flow records that are unlabeled into the unsupervised algorithms. Thus, receiving the N of computer network data communication flow records can include receiving only unlabeled flow records. Alternatively, in some embodiments, substantially all computer network data communication flow records passing through a network are received at block 1205, and ultimately subjected to the process 1200.

At block 1210, a number M of unsupervised learning methods 204 are applied to each of the N computer network data communication flow records. According to the embodiments, the unsupervised learning methods may involve training and/or data analysis on unlabeled data received in previous block 1205, in order to ultimately assign or generate a label for the unlabeled data. The unlabeled data may be received without labeled outputs or target variables.

At block 1215, a score is received for each of the N network data communication flow records from each of the M unsupervised learning methods.

At block 1220, these scores are assembled into a N by M matrix.

At block 1225, the N by M matrix 208 is factored. A factor analysis operation can be performed to factor the N by M matrix to determine a subsets of unsupervised learning methods as factors, where each subset of the unsupervised learning method represents a latent dimension of the data.

At block 1230, the subsets of the unsupervised learning methods are weighted. A factor loading value operation can be performed, where each subset of unsupervised learning methods is weighted respectively according to a factor loading value of the unsupervised learning method. The weighting is executed in order to derive a respective final score that is applied to determine an anomaly in the subset of the network data communications. In some embodiments, the weighting can be improved based on the historical performance of an individual unsupervised learning method.

At block 1235, one unsupervised learning method subset is selected per subset. The selection can diversify methods based on latent dimensions to produce an aggregation of the final scores of the selected unsupervised learning methods.

At block 1240, one or more distribution tests are performed on the final scores to identify anomaly probabilities according to respective distributions. In some cases, block 1240 involves determining whether each of the one or more distribution tests meet a goodness of fit criterion. If the goodness of fit does not meet the criterion, then the one or more distribution tests at block 1240 can be repeatedly performed on the next final score. Alternatively, if it is determined that the goodness of fit does meet the goodness of fit criterion then the method 1200 continues to block 1245.

At block 1245, a list of computer network data communication flow records represented by the distribution is output to an output cache. The distribution may be passed, after satisfying the distribution tests in previous block 1240, to output the list of flow records represented by the distribution. In some embodiments, block 1245 involves applying a distribution-based outlier rule for anomaly labeling. The distribution may typically correspond to one of the latent dimensions. Accordingly, applying the distribution outlier rule to the distribution corresponding to the latent dimension includes labeling the distribution of anomalous flow records. The computer network data communication flow records represented by the distribution, and indicated in the list, are designated/labeled as anomalous flows. Thus, the computer network data communication flow records that are labeled as anomalous by the method 1200 can be further employed by various other functions of the anomaly detection system, as disclosed herein.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

The process may be implemented by a computer system. The computer system may include a bus or other communication mechanism for communicating information, one or more hardware processors coupled with the bus for processing information. The hardware processor(s) may be, for example, one or more general purpose microprocessors.

The computer system also includes a main memory, such as a random access memory (RAM), cache and/or other dynamic storage devices, coupled to the bus for storing information and instructions to be executed by the processor. The main memory also may be used for storing temporary variables or other intermediate information during execution of instructions to be executed by the processor. Such instructions, when stored in storage media accessible to the processor, render the computer system into a special-purpose machine that is customized to perform the operations specified in the instructions.

The computer system further includes a read only memory (ROM) or other static storage device coupled to the bus for storing static information and instructions for the processor. A storage device, such as a magnetic disk, optical disk, or thumb drive, may be coupled to the bus for storing information and instructions.

The computer system may be coupled via the bus to a display, such as a liquid crystal display (LCD), for displaying information to a computer user. An input device, including alphanumeric and other keys, is coupled to the bus for communicating information and command selections to the processor. Another type of user input device is a mouse, a trackball, or cursor direction keys for communicating direction information and command selections to the processor and for controlling cursor movement on the display. In some embodiments, the same direction information and command selections as cursor control may be implemented via receiving touches on a touch screen without a cursor.

The computing system may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system may implement the techniques described herein using customized hard-wired logic, one or more ASICs or FPGAs, firmware and/or program logic which in combination with the computer system causes or programs the computer system to be a special-purpose machine. According to one embodiment, the techniques herein are performed by the computer system in response to the processor(s) executing one or more sequences of one or more instructions contained in the main memory. Such instructions may be read into the main memory from another storage medium. Execution of the sequences of instructions contained in the main memory causes the processor(s) to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks. Volatile media includes dynamic memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise a bus. Transmission media can also take the form of acoustic or light waves, such as those generated during radio-wave and infra-red data communications.

The computer system also includes a communication interface coupled to the bus. The interface provides a two-way data communication coupling to one or more network links that are connected to one or more local networks. For example, the interface may be an integrated services digital network (ISDN) card, cable modem, satellite modem, or a modem to provide a data communication connection to a corresponding type of telephone line. As another example, the interface may be a local area network (LAN) card to provide a data communication connection to a compatible LAN (or WAN component to communicated with a WAN). Wireless links may also be implemented. In any such implementation, the interface sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet-switched data communication network now commonly referred to as the "Internet." Local network and Internet both use electrical, electromagnetic or optical signals that carry digital data streams. The signals through the various networks and the signals on network links and through an interface, which carry the digital data to and from the computer system, are example forms of transmission media.

The computer system can send messages and receive data, including program code, through the network(s), network links, and interfaces. In the Internet example, a server might transmit a requested code for an application program through the Internet, the ISP, the local network and the interface.

The received code may be executed by the processor as it is received, and/or stored in the storage device, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer method for performing labeling for anomaly detection comprising:
   receiving a number N of computer network data communication flow records;
   applying a number M of unsupervised learning methods for each of the N computer network data communication flow records;
   receiving a score for each of the N computer network data communication flow records from each of the M unsupervised learning methods;
   assembling the scores into an N by M matrix;
   factoring the N by M matrix to determine subsets of unsupervised methods as factors;
   weighting each subset of unsupervised learning methods respectively according to a factor loading value of the unsupervised learning method to derive a respective final score;
   selecting one unsupervised learning method per subset to produce an aggregation of the final scores of the selected unsupervised learning methods;
   performing one or more distribution tests on the final scores to identify anomaly probabilities according to respective distributions; and
   outputting a list of computer network data communication flow records represented by the distribution to an output cache, wherein the network data communication flow records represented by the distribution are designated as anomalous.

2. The computer method of claim 1, further comprising:
   determining if each of the one or more distribution tests meet a goodness of fit criterion;
   wherein if the goodness of fit does not meet the goodness of fit criterion, repeat performing the one or more distribution tests on a next final score; and
   wherein if the goodness of fit does meet the goodness of fit criterion, outputting the list of computer network data communication flow records represented by the distribution to an output cache.

3. The computer method of claim 2, wherein the distribution corresponds to one or more latent dimensions.

4. The computer method of claim 1, further comprising:
   outputting at least one computer network data communication flow record designated as anomalous by:
   displaying a graphical user interface (GUI) on an electronic display, the GUI displaying an indication of the at least one anomalous computer network data communication flow record for viewing by a network security analyst for supervised label verification.

5. The computer method of claim 4, further comprising:
   determining flow record metadata for each anomalous computer network data communication flow record associated with the distribution.

6. The computer method of claim 5, further comprising:
   scanning network traffic for computer network data communication flow records that are determined as anomalous computer network data communication flow records.

7. The computer method of claim 1, further comprising:
   applying a distribution outlier rule to the distribution corresponding to a latent dimension, where the applying includes labeling the distribution of the anomalous computer network data communication flow records.

8. The computer method of claim 7, where the labeled anomalous computer network data communication flow records are analyzed by a supervised and semi-supervised algorithms to generate labeled training data models.

9. The computer method of claim 1, wherein the method is repeated for a next set of N computer network data communication flow records.

10. The computer method of claim 1, wherein the method occurs in 500 milliseconds or less.

11. The computer method of claim 1, wherein the method occurs in 250 milliseconds or less.

12. The computer method of claim 1, further comprising:
filtering the computer network data communication flow records that are unlabeled; and
wherein receiving the number N of computer network data communication flow records comprises receiving only the unlabeled computer network data communication flow records.

13. The computer method of claim 1, wherein the method screens the computer network data communication flow records passing through a network information technology infrastructure.

14. The computer method of claim 1, wherein the method is performed in parallel by a plurality of processor cores.

15. The computer method of claim 1, wherein the computer network data communication flow records are received from a packet-switched network and wherein each of the computer network data communication flow records corresponds to an ordered sequence of packets respectively including a header and payload.

16. The computer method of claim 1, wherein at least a portion of the M unsupervised learning methods includes matching one or more character strings associated with anomalous computer network data communication flow records.

17. A non-transitory computer-readable storage medium storing a plurality of instructions executable by one or more processors, the plurality of instructions when executed by the processor causes the processor to:
receive a number N of computer network data communication flow records;
apply a number M of unsupervised learning methods for each of the N computer network data communication flow records;
receive a score for each of the N computer network data communication flow records from each of the M unsupervised learning methods;
assemble the scores into an N by M matrix;
factor the N by M matrix to determine subsets of unsupervised methods as factors;
weight each subset of unsupervised learning methods respectively according to a factor loading value of the unsupervised learning method to derive a respective final score;
select one unsupervised learning method per subset to produce an aggregation of final scores of the selected unsupervised learning methods;
perform one or more distribution tests on the final scores to identify anomaly probabilities according to respective distributions; and
output a list of computer network data communication flow records represented by the distribution to an output cache, wherein the network data communication flow records represented by the distribution are designated as anomalous.

18. The non-transitory computer-readable storage medium of claim 17, wherein the plurality of instructions when executed by the processor further causes the processor to:
determine if each of the one or more distribution tests meet a goodness of fit criterion; wherein if the goodness of fit does not meet the goodness of fit criterion, repeat performing the one or more distribution tests on a next final score; and
if the goodness of fit does meet the goodness of fit criterion, outputting the list of computer network data communication flow records represented by the distribution to an output cache.

19. The non-transitory computer-readable storage medium of claim 17, wherein the distribution corresponds to one or more latent dimensions.

20. The non-transitory computer-readable storage medium of claim 17, wherein the plurality of instructions when executed by the processor further causes the processor to:
output at least one computer network data communication flow record designated as anomalous by displaying a graphical user interface (GUI) on an electronic display, the GUI displaying an indication of the at least one anomalous computer network data communication flow record for viewing by a network security analyst for supervised label verification.

* * * * *